F. C. PAHLOW.
HOSE COUPLING.
APPLICATION FILED AUG. 28, 1915.
1,245,614.
Patented Nov. 6, 1917.
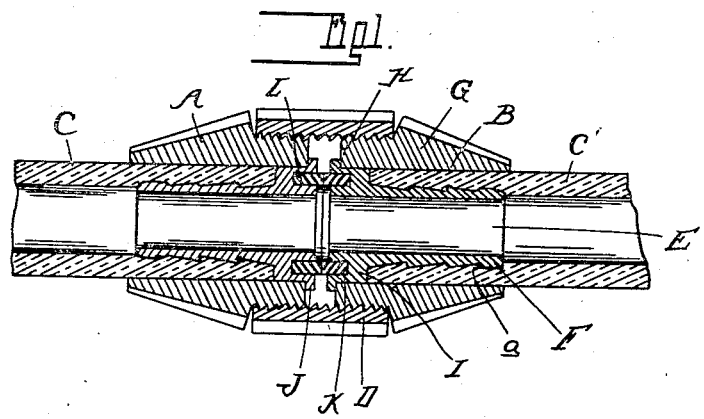
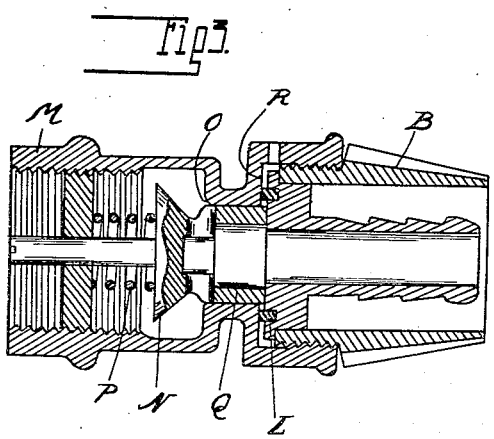
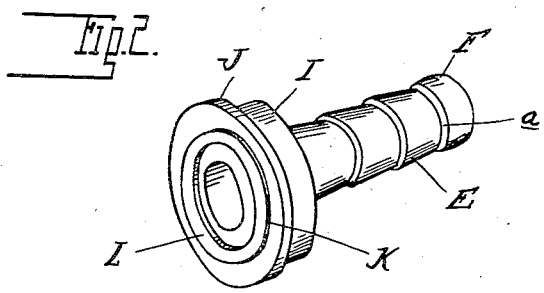
Inventor
Frank C. Pahlow
By
Attorneys

# UNITED STATES PATENT OFFICE.

FRANK C. PAHLOW, OF ASHTABULA, OHIO.

HOSE-COUPLING.

1,245,614.

Specification of Letters Patent.

Patented Nov. 6, 1917.

Application filed August 28, 1915. Serial No. 47,722.

*To all whom it may concern:*

Be it known that I, FRANK C. PAHLOW, a citizen of the United States of America, residing at Ashtabula, in the county of Ashtabula and State of Ohio, have invented certain new and useful Improvements in Hose-Couplings, of which the following is a specification, reference being had therein to the accompanying drawings.

The invention relates to hose couplings, and while a coupling embodying the invention is adapted for other uses, it is particularly designed to be employed in connection with hose or conduits used for fluid under pressure.

The invention consists in the provision of a simple and efficient hose coupling; in the provision of a simple and efficient hose coupling that may be easily and cheaply manufactured; in the provision of a simple construction of hose coupling in which leakage between the connected portions of the coupling is effectively prevented. The invention further consists in certain details of construction, arrangement and combination of parts as will more fully hereinafter appear.

In the drawings,—

Figure 1 is a longitudinal central section through a coupling embodying the invention, showing the same as applied to a flexible hose;

Fig. 2 is a perspective view of one of the coupling parts; and

Fig. 3 illustrates a modification.

Referring to the structure shown in Figs. 1 and 2, A and B are the members of the coupling which are attached to the meeting ends C C' of the hose, and D is the connecting member. Each of the members A and B is composed of an inner tubular member E having a stem F adapted to be inserted within the end of the hose, and an outer member G arranged upon the exterior of the hose. The stem F has the outer face thereof provided with a suitable surface such as the shoulders a—to interlock with the end of the hose, as will be readily understood. The outer member G is free to turn upon the hose and the inner end H of the member G is preferably of reduced cross-section and is externally threaded to engage the internal threads of the member D. The latter and the members G preferably have their outer faces of polygonal form so as to provide wrench-holds. At the forward end the inner member E is provided with a cylindrical portion I nicely fitted within the inner end of the member G. Beyond the portion I is an annular shoulder or flange J which is engaged by the inner end of the member G.

To couple the meeting ends of the hose together it is merely necessary to engage the threaded ends of the members G with the member D and then effect a relative rotation between the latter and the members G so as to bring the inner ends of the members E into contact. In order to effectively prevent leakage between the inner ends of the members E, the inner end of each of said members is provided with an annular recess K within which is arranged a suitable packing material, preferably an annular washer L. Thus when the inner ends of the members F are drawn together, the washers will be tightly compressed, preventing leakage through the connecting portions of the coupling. The arrangement of the packing material in a recess in the inner end of the member E forms a very simple and very efficient manner of sealing the joint between the coupling parts. In this connection it is to be understood that the invention is not limited to coöperating coupling members of the same construction, since a coupling member embodying the invention may be employed for engagement with coupling members of various types. Thus in Fig. 3 the coupling member B is shown as connected to a coupling member M that is provided with a valve N, the parts, however, being shown on a larger scale than in Fig. 1. Normally the valve N is held against its seat O by means of a spring P, but when the coupling member B is engaged with the member M the inner end of the member E will engage the projecting end Q of the valve N and force the valve from its seat against the tension of the spring P. As shown the member M is provided with a shoulder R against which the packing L is pressed.

With the coupling member embodying the invention, it will be noticed that during the connecting of the coöperating coupling members the inner end H of the member G engages the collar J of the member E. This prevents any relative longitudinal movement between the inner and outer coupling members and thereby prevents any tendency to loosen the inner member during the connecting together of coöperating coupling members.

From the foregoing description it will be readily apparent that the structure is one that may be easily and cheaply manufactured and provides an efficiently sealed joint between the coupling members and also provides a structure in which the coupling operation is very simply performed.

What I claim as my invention is:—

1. In a hose coupling, the combination of an outer member for rotatively engaging over the end of a hose, said member having a portion shaped to form a wrench hold and having its forward end externally threaded, and an inner member provided with a stem portion adapted to be secured within the end of a hose, and forwardly of said stem portion having an enlarged head, said head having a cylindrical surface on the exterior thereof arranged within the forward end of the outer member and forming a bearing surface on which said outer member is rotated, there being an annular shoulder at the forward end of the bearing surface forming an abutment for the forward end of the outer member.

2. A hose coupling outfit, comprising complementary coupling sections each composed of an outer member for rotatively engaging over the end of a hose, said member having a portion shaped to form a wrench hold and having its forward end externally threaded, and an inner member provided with a stem portion adapted to be secured within the end of the hose, and forwardly of said stem portion having an enlarged head, said head having a cylindrical surface on the exterior thereof arranged within the forward end of the outer member and forming a bearing surface on which said outer member is rotated, there being an annular shoulder at the forward end of the bearing surface forming an abutment for the forward end of the outer member, an internally-threaded ring for engaging the externally-threaded end of the outer member of each section for drawing said sections together, and a valve-controlled coupling section having an internally-threaded portion with which the externally-threaded end of the outer member of either of the complementary coupling sections is adapted to engage.

In testimony whereof I affix my signature in presence of two witnesses.

FRANK C. PAHLOW.

Witnesses:
 FRED H. FOLK,
 JOHN RIDDELL.